(12) United States Patent
Halter et al.

(10) Patent No.: US 9,198,341 B2
(45) Date of Patent: Dec. 1, 2015

(54) AGRICULTURAL MACHINE WITH A FOLDING DEVICE

(75) Inventors: Cedric Halter, Wasselonne (FR); Joel Wilhelm, Saint-Louis (FR)

(73) Assignee: KUHN S.A., Saverne (FR)

( * ) Notice: Subject to any disclaimer, the term of this patent is extended or adjusted under 35 U.S.C. 154(b) by 151 days.

(21) Appl. No.: 14/112,467

(22) PCT Filed: Apr. 5, 2012

(86) PCT No.: PCT/FR2012/050741
§ 371 (c)(1),
(2), (4) Date: Oct. 17, 2013

(87) PCT Pub. No.: WO2012/143641
PCT Pub. Date: Oct. 26, 2012

(65) Prior Publication Data
US 2014/0033671 A1 Feb. 6, 2014

(30) Foreign Application Priority Data

Apr. 21, 2011 (FR) ...................................... 11 53453

(51) Int. Cl.
*A01B 49/00* (2006.01)
*A01B 73/04* (2006.01)
(Continued)

(52) U.S. Cl.
CPC ............. *A01B 73/044* (2013.01); *A01B 73/048* (2013.01); *A01B 73/067* (2013.01); *A01D 34/66* (2013.01); *A01D 34/661* (2013.01); *A01D 75/303* (2013.01)

(58) Field of Classification Search
CPC . A01D 78/1014; A01D 34/64; A01D 67/005; A01D 34/661; A01D 84/00; A01B 73/02; A01B 73/06; A01B 73/062; A01B 73/067

USPC ........................... 172/311; 56/14.9, 15.2, 255
See application file for complete search history.

(56) References Cited

U.S. PATENT DOCUMENTS 3,536,144 A 10/1970 Hood et al.
4,074,765 A 2/1978 Van Der Lely
(Continued)

FOREIGN PATENT DOCUMENTS

DE 10 2006 019032 11/2007
WO 91 03922 4/1991

OTHER PUBLICATIONS

U.S. Appl. No. 14/404,498, filed Nov. 28, 2014, Halter, et al.
(Continued)

*Primary Examiner* — Árpád Fábián-Kovács
(74) *Attorney, Agent, or Firm* — Oblon, McClelland, Maier & Neustadt, L.L.P.

(57) ABSTRACT

Agricultural machine including a central frame and two work devices, the central frame being connectable to a tractor, and being provided with wheels, each work device being connected to the central frame by a first articulation and being able to be moved between a transport position and a work position. The central frame is composed of a front part, a rear part and an articulation device connecting the front part to the rear part and being able to pivot in a plane which is vertical and parallel to the direction of advance with respect to the front part and to the rear part, each work device is connected to the articulation device by the first articulation, the axis of which extends in a plane which is vertical and parallel to the direction of advance, in the plane and in the transport position, the axis of the first articulation has an inclination towards the ground following a direction opposite to the direction of advance, and in the transport position, each work device is folded towards the rear about the first articulation.

28 Claims, 12 Drawing Sheets

(51) Int. Cl.
*A01B 73/06* (2006.01)
*A01D 34/66* (2006.01)
*A01D 75/30* (2006.01)

(56) References Cited

U.S. PATENT DOCUMENTS

| | | | |
|---|---|---|---|
| 4,117,893 A * | 10/1978 | Kinzenbaw | 172/311 |
| 4,896,732 A * | 1/1990 | Stark | 172/311 |
| 5,052,495 A | 10/1991 | McFarlane et al. | |
| 5,158,145 A * | 10/1992 | Karchewski | 172/548 |
| 6,374,921 B1 * | 4/2002 | Friggstad | 172/311 |
| 7,024,844 B2 * | 4/2006 | Schlesser et al. | 56/14.9 |
| 7,207,166 B2 * | 4/2007 | Stephenson | 56/15.2 |
| 7,549,482 B2 * | 6/2009 | Wake et al. | 172/311 |
| 7,581,597 B2 * | 9/2009 | Neudorf et al. | 172/311 |
| 7,596,935 B2 * | 10/2009 | Bollinger et al. | 56/14.9 |
| 7,658,056 B2 * | 2/2010 | Thompson et al. | 56/15.8 |
| 7,827,774 B2 * | 11/2010 | Dow et al. | 56/192 |
| 8,261,521 B2 * | 9/2012 | Thompson | 56/15.8 |
| 8,342,256 B2 * | 1/2013 | Adams et al. | 172/311 |
| 8,511,052 B2 * | 8/2013 | Dow et al. | 56/364 |
| 8,528,308 B2 * | 9/2013 | Priepke | 56/15.8 |
| 8,567,517 B2 * | 10/2013 | Friggstad et al. | 172/140 |
| 8,863,489 B2 * | 10/2014 | Landon et al. | 56/221 |
| 2009/0107097 A1 * | 4/2009 | Thompson et al. | 56/15.8 |

OTHER PUBLICATIONS

International Search Report Issued Aug. 2, 2012 in PCT/FR12/050741 Filed Apr. 5, 2012.

* cited by examiner

AGRICULTURAL MACHINE WITH A FOLDING DEVICE

BACKGROUND OF THE INVENTION

1. Field of the Invention

The present invention relates to an agricultural machine comprising:
- a central frame designed to be connected to a tractor so as to be towed by the latter, and provided with wheels in contact with the ground,
- two work devices, each connected to the central frame by a first articulation and being able to be displaced between a transport position, in which each work device extends in a plane substantially parallel to the direction of advance of the machine, and a work position in which each work device extends in a plane substantially perpendicular to the direction of advance of the machine.

2. Description of the Related Art

An agricultural machine of the drawn mower type, including a towable frame on which two mowing devices are articulated, is known from the document EP 1 616 474 A1. The frame is designed to be connected to a tractor so as to be towed by the latter, and is provided with wheels resting on the ground. The mowing devices are mounted on an articulation respectively on each respective side of the chassis so as to rock in a horizontal plane extending laterally between a work position and a transport position.

To this end, each of the mowing devices includes a support framework and a support arm, the support framework being connected to the support arm by an articulation having an axis substantially parallel to the direction of advance of the machine when the mowing device is unfolded in the work position. The support arm is connected to the frame by an articulation device including on one hand an articulation, the axis of which is substantially parallel to the direction of advance of the machine when the mowing device is unfolded in the work position, on another hand an articulation, the axis of which is substantially vertical, the articulations of the articulation device being situated close to one another. The articulation device is positioned on the front end of the frame.

In order to be moved from the work position to the transport position, each of the mowing devices in the work position is firstly raised vertically by means of the support arm, then each of the mowing devices is displaced towards the rear in a horizontal plane by means of the articulation having a substantially vertical axis situated on the front end of the frame, before being lowered to come to rest on an abutment element.

The mower described above presents a certain number of drawbacks.

Firstly, the width of the machine, when the mowing devices are folded in the transport position, remains relatively large. In fact, when each of the mowing devices is in the work position, it presents itself in a lateral view of the machine as a substantially parallelepipedic assembly, the horizontal dimension of which is greater than the vertical dimension. When each of the mowing devices is in the transport position, the total width of the machine is at least equal to the sum of the horizontal dimensions and therefore proves to be large.

Secondly, by defining the mowing width of a mowing device in the work position as being the dimension of the mowed part measured following a direction perpendicular to the direction of advance of the machine, the fact of increasing the mowing width by a certain amount results in an increase of an amount substantially equal to the total length of the machine when the mowing device is in the transport position. This increase comes to hinder the handling of the machine.

Thirdly, the equilibrium of the machine during work requires that in this position, the wheels resting on the ground are positioned behind the work devices, which determines at a relatively high value the wheelbase defined by the distance between the rotation axis of the wheels resting on the ground and the rotation axis of the rear wheels of the tractor. Now, as the frame has a fixed geometry, this wheelbase is constant whatever the position of the machine. Thus, in transport position, the relatively large wheelbase comes to hinder the handling of the machine when cornering.

Fourthly, the work devices, in the transport position, extend at a certain distance above a horizontal plane situated above the wheels resting on the ground, which raises the centre of gravity of the machine and therefore increases its instability during transport.

BRIEF SUMMARY Of THE INVENTION

The present invention has as its aim an agricultural machine provided with a central articulated frame, to which work devices are connected, the central frame and the work devices being designed so as to avoid the above-mentioned drawbacks.

To this end, an important feature of the invention consists in that the central frame is composed of a front part, of a rear part with the wheels and of an articulation device. The articulation device connects the front part and the rear part and can pivot, by means of a displacement device, in a plane which is substantially vertical and substantially parallel to the direction of advance of the machine with respect to the front part and with respect to the rear part. Moreover, each of the work devices is connected to the articulation device by a first articulation, the axis of which extends in a plane which is substantially vertical and substantially parallel to the direction of advance of the machine. In addition, in the plane and in the transport position, the axis of the first articulation has an inclination towards the ground following a direction opposite to the direction of advance, and in the transport position, each work device is folded towards the rear about the corresponding first articulation.

In the work position, each of the work devices can pivot about the corresponding first articulation so as to readily follow the differences in level of the ground. In the transport position, the articulation device is lowered and brought closer to the front part, which allows the centre of gravity of the central frame to be moved towards the front and towards the ground. The displacement of the articulation device combined with the folding towards the rear of the work devices renders the machine, in transport position, relatively compact in length. Moreover, the wheels are closer to the rear wheels of the tractor than in the work position, which improves the handling of the machine when cornering, facilitates entry onto the plot, and renders recourse to a directional train of wheels superfluous.

Another important feature of the invention consists in that each of the work devices includes a connecting device having variable geometry. This property contributes to reducing the length of the machine in the transport position. In addition, with the machine preferably being used in combination with a frontal machine, this property ensures an overlap between the working width of the frontal machine and the respective working widths of the work devices.

BRIEF DESCRIPTION OF THE SEVERAL VIEWS OF THE DRAWINGS

Other features and advantages of the invention will emerge from the following description with reference to the attached drawings which represent, by way of non-restrictive example, several embodiments of the agricultural machine according to the invention.

In these drawings.

DETAILED DESCRIPTION OF THE INVENTION

It will be noted that the machine according to the invention presents a symmetry along a vertical plane parallel to the direction of advance. Some of the attached drawings only show a portion of the machine, and it is readily understood that the portions which are not figured have the same features as those represented with which they provide the abovementioned symmetry relationship. With the aim of simplification, the symmetrical elements are designated by the same reference number.

Figure 2:
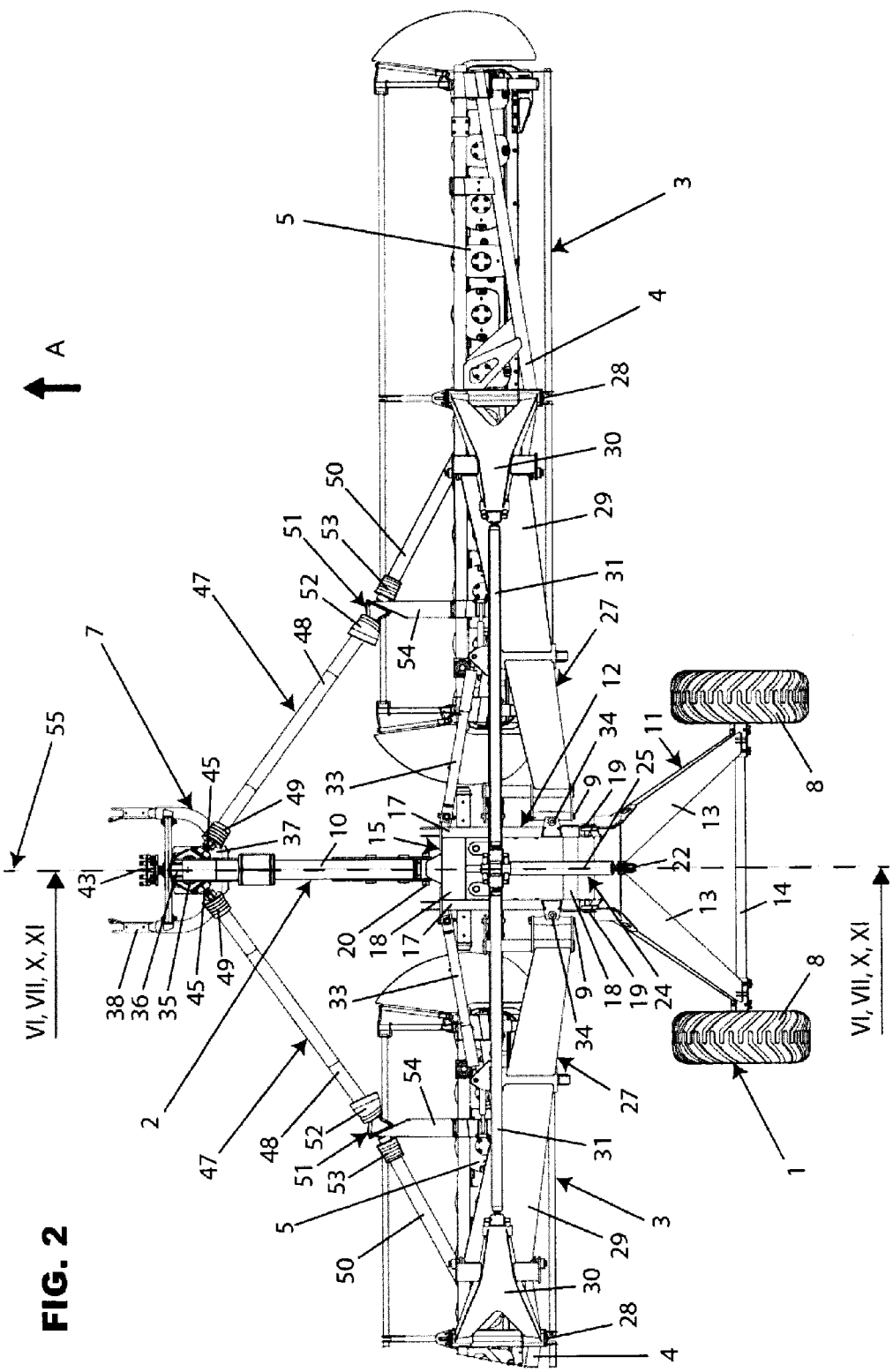
FIG. 2 represents a top view of the first variant embodiment of the machine in work position, the work element on the left of the view being partially represented.

As can be seen from FIG. 2, the agricultural machine (1) according to the invention comprises a central frame (2) and two work devices (3) each including a support framework (4) supporting at least one work element (5), the work devices (3) being placed in a substantially symmetrical manner on either side of the central frame (2) with respect to a plane (55) oriented vertically and parallel to the direction of advance (A). The central frame (2) is connected to a tractor (6) so as to be towed by the latter by means of a hitching device (7). The central frame (2) is, moreover, supported on the ground by a train of wheels comprising at least two wheels (8).

Figure 4:
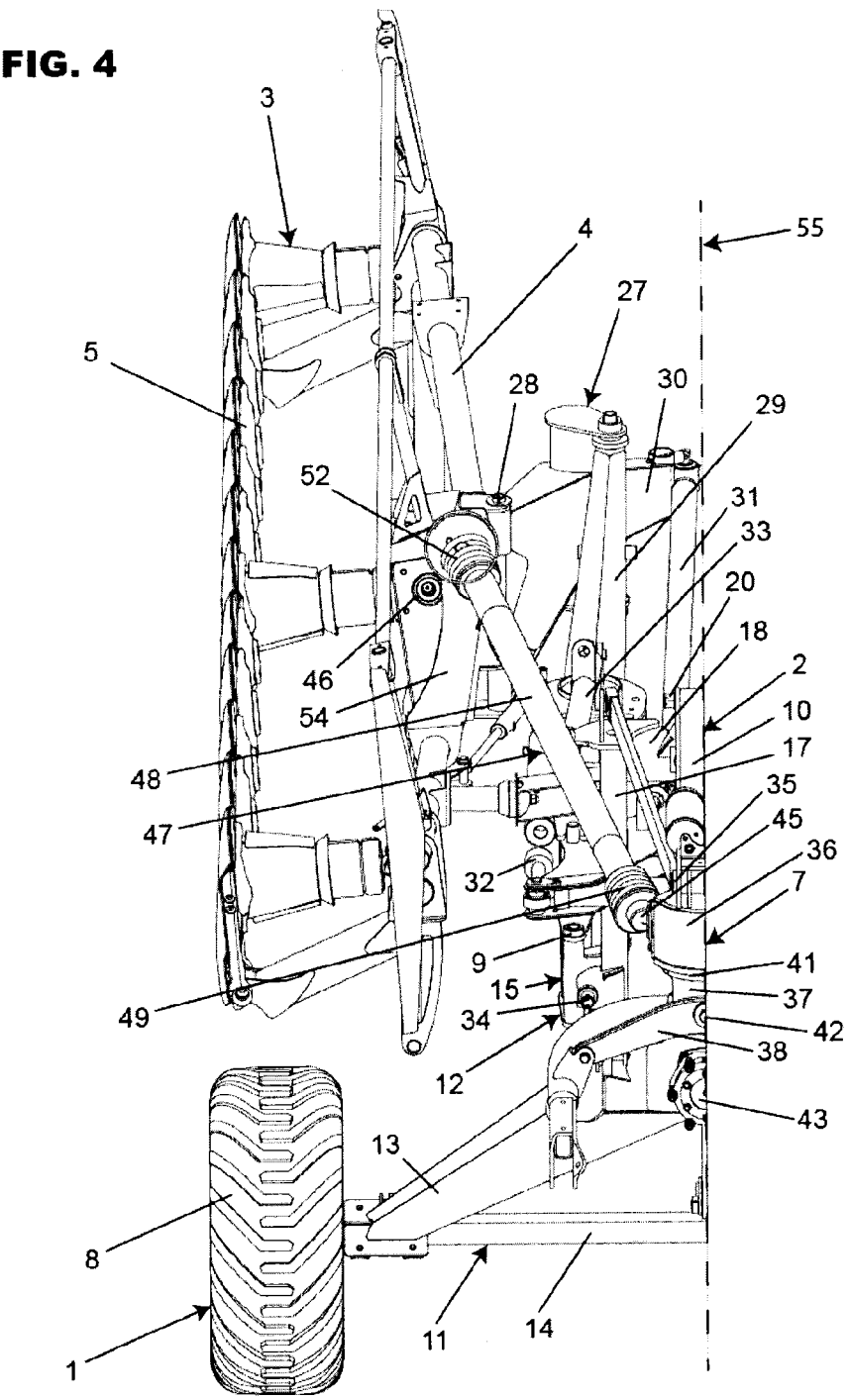
FIG. 4 represents a partial front view of the first variant embodiment of the machine in transport position.
Figure 5:
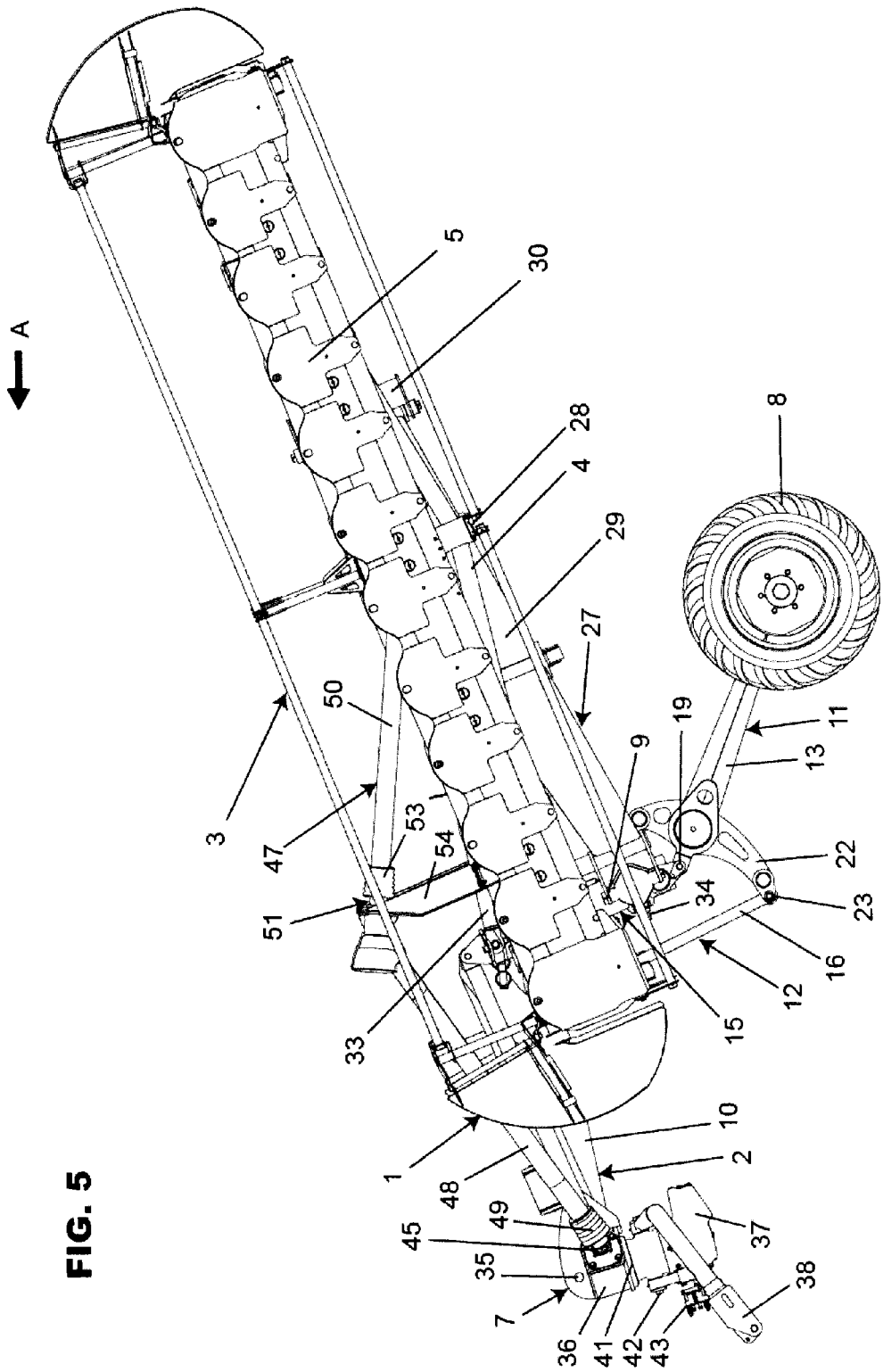
FIG. 5 represents a side view of the first variant embodiment of the machine in transport position.
Figure 9:
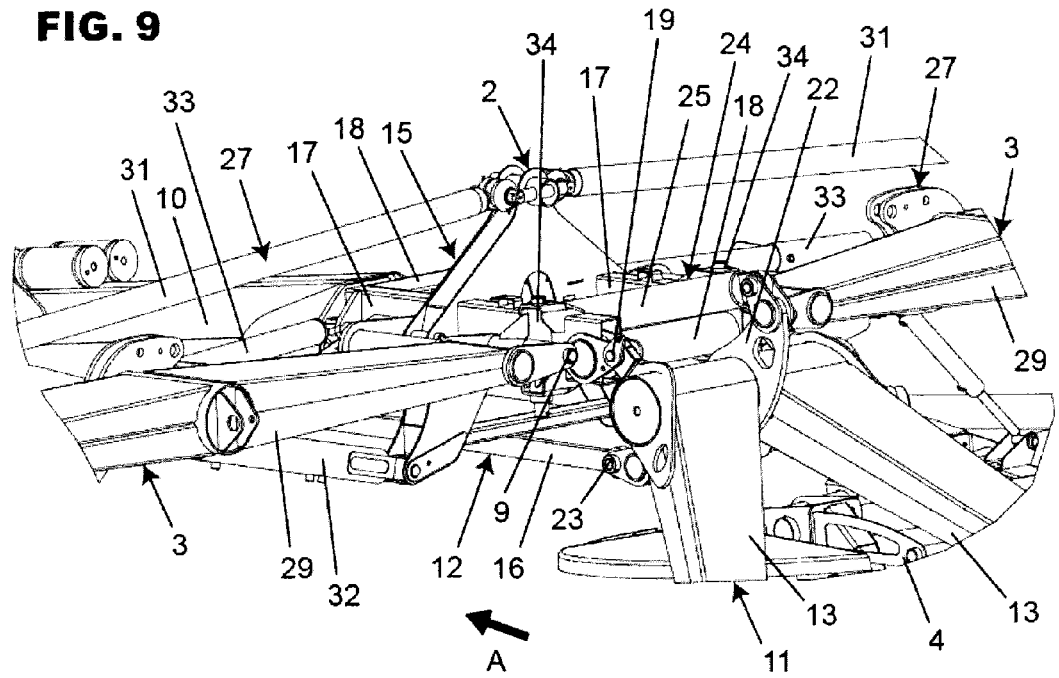
FIG. 9 represents on a larger scale a partial perspective view of the first variant embodiment of the machine in work position.

Each work device (3) is connected to the central frame (2) by a first articulation (9), readily visible in FIGS. 2 and 9, and the first articulations (9) are placed in a substantially symmetrical manner on either side of the plane (55). The first articulations (9) behave as pivot connections. Each work device (3) can be moved between a transport position, in which each extends in a plane substantially parallel to the direction of advance (A), as shown in FIGS. 4 and 5, and a work position, in which each extends in a plane substantially perpendicular to the direction of advance (A), as shown in FIG. 2.

An essential feature of the invention lies in the fact that the central frame (2) is composed of a front part (10), a rear part (11) and an articulation device (12). The front part (10) is connected to the hitching device (7) which is detailed further below in the present description. The front part (10) presents itself as an elongated member formed by a machine-welded assembly of tubes and reinforcement sheets. The rear part comprises a V-shaped machine-welded assembly constituted by two arms (13) extending towards the rear. The lower ends of the arms (13) come to support an axle (14) substantially perpendicular to the direction of advance (A) at the ends of which the wheels (8) in contact with the ground are mounted in a pivot connection.

In a first variant embodiment of the machine (1), illustrated by FIGS. 1 to 9, the articulation device (12) is composed of an upper connecting-rod (15) and a lower connecting-rod (16) connecting the front part (10) and the rear part (11) and forming a deformable quadrilateral in a plane which is substantially vertical and substantially parallel to the direction of advance (A). The connecting-rods (15, 16) are substantially parallel with respect to one another. The upper connecting-rod (15) is formed by a machine-welded assembly of longitudinal tubes (17) and of transverse tubes (18) forming a box to which extensions are welded serving as a support to articulations. Thus, the upper connecting-rod (15) is articulated to the work devices (3) by the first articulations (9), which are positioned on the lateral parts of the longitudinal tubes (17). The first articulations (9) have an axis which extends in a plane which is substantially vertical and substantially parallel to the direction of advance (A). Furthermore, the upper connecting-rod (15) is connected to the upper ends of the arms (13) by two articulations (19), the axes of which extend in a direction substantially perpendicular to the direction of advance (A). Finally, the upper connecting-rod (15) is connected to the front part (10) by an articulation (20), the axis of which extends in a direction substantially perpendicular to the direction of advance (A). The lower connecting-rod (16) presents itself as a bar, the front end of which is connected to the front part (10) by an articulation (21), the axis of which extends in a direction substantially perpendicular to the direction of advance (A). At the upper ends of the arms (13) and between them a substantially planar arc-shaped connecting sheet (22) is welded. The rear end of the lower connecting-rod (16) is connected to the lower end of the connecting sheet (22) by an articulation (23), the axis of which extends in a direction substantially perpendicular to the direction of advance (A).

The quadrilateral can be deformed by means of a displacement device (24). In the first variant embodiment of the machine (1), illustrated by FIGS. 1 to 9, the displacement device (24) is formed by a device of variable length (25) articulated between the front part (10) and the rear part (11).

Figure 10:
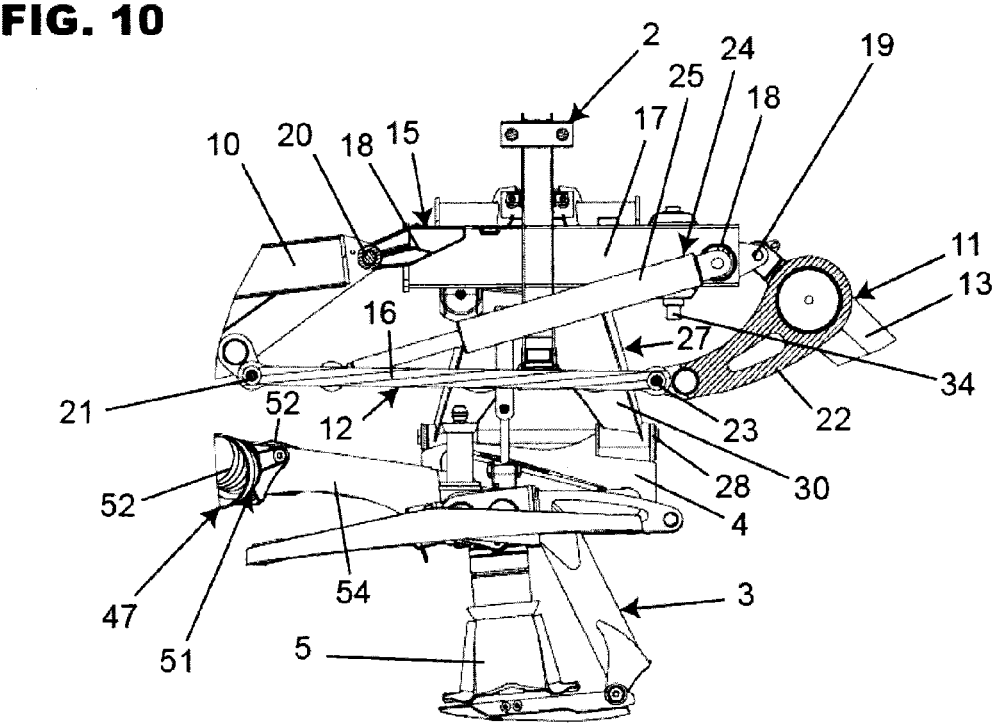
FIG. 10 represents a partial section of a second variant embodiment of the machine in work position along the section X-X of FIG. 2.
Figure 11:
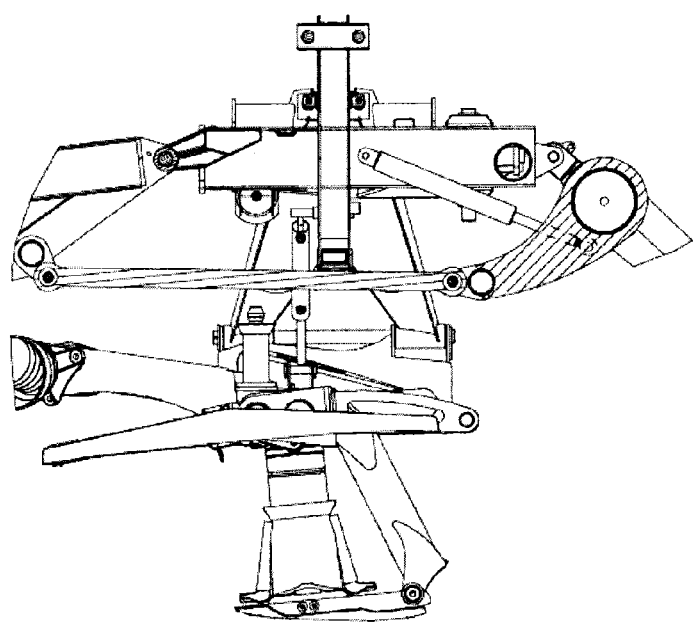
FIG. 11 represents a partial section of a third variant embodiment of the machine in work position along the section XI-XI of FIG. 2.

A second variant embodiment of the machine as well as a third are distinguished from the first by the fact that the device of variable length (25) is articulated in a different manner. In fact, in the second example embodiment illustrated by FIG. 10, the device of variable length (25) is articulated between the upper connecting-rod (15) and the lower connecting-rod (16). In the third example embodiment illustrated by FIG. 11, the device of variable length (25) is articulated between one of the connecting-rods (15, 16) and the central frame (2), i.e. between one of the connecting-rods (15, 16) and the front part (10) or else one of the connecting-rods (15, 16) and the rear part (11).

In the first, second and third above-mentioned variant embodiments, the device of variable length (25) can be a hydraulic jack.

Figure 1:
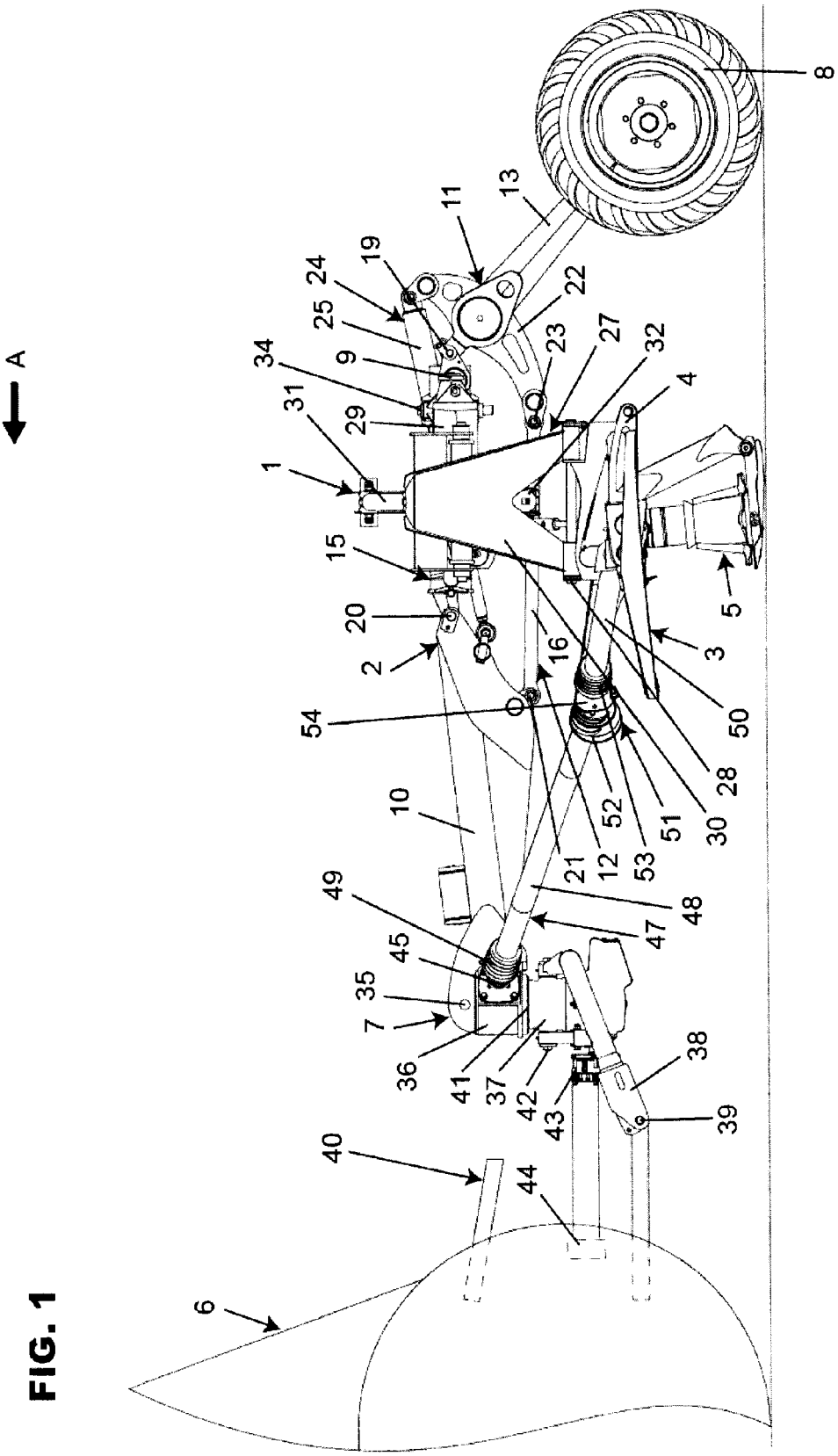
FIG. 1 represents a side view of a first variant embodiment of the machine according to the invention, in work position and hitched to a tractor.
Figure 6:
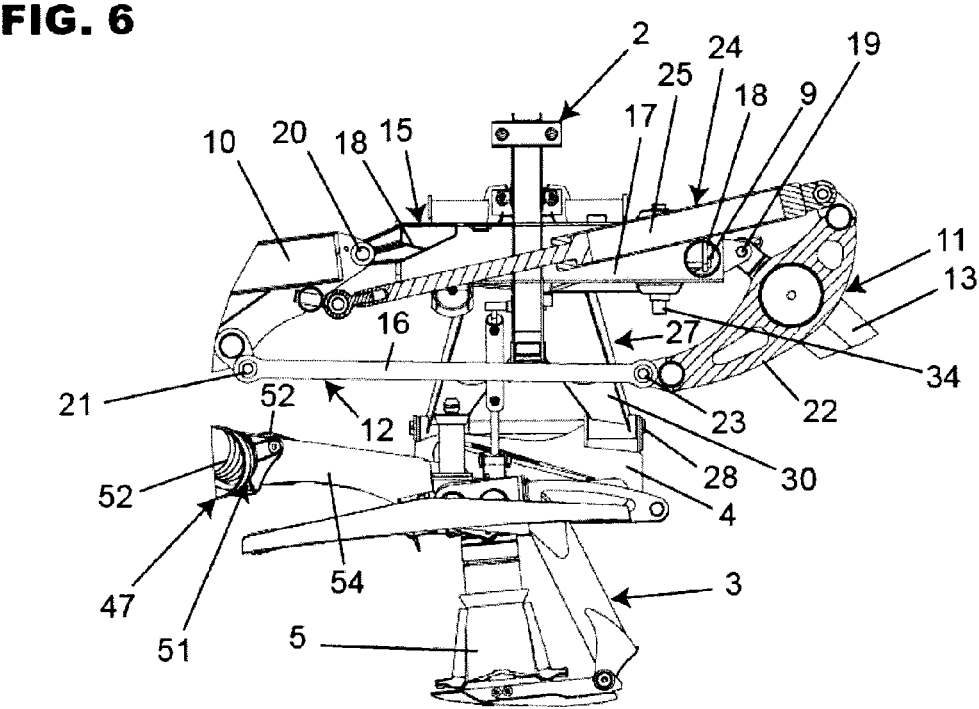
FIG. 6 represents a partial section of the first variant embodiment of the machine in work position along the section VI-VI of FIG. 2.

In the work position, it can be seen from FIGS. 1 and 6 that the upper connecting-rod (15) and the lower connecting-rod (16) are substantially horizontal. The device of variable length (25) has a maximum length. The wheels (8) are positioned behind the work devices (3). Each of the work devices (3) can pivot about the corresponding first articulation (9) so as to follow the differences in level of the ground.

Figure 7:
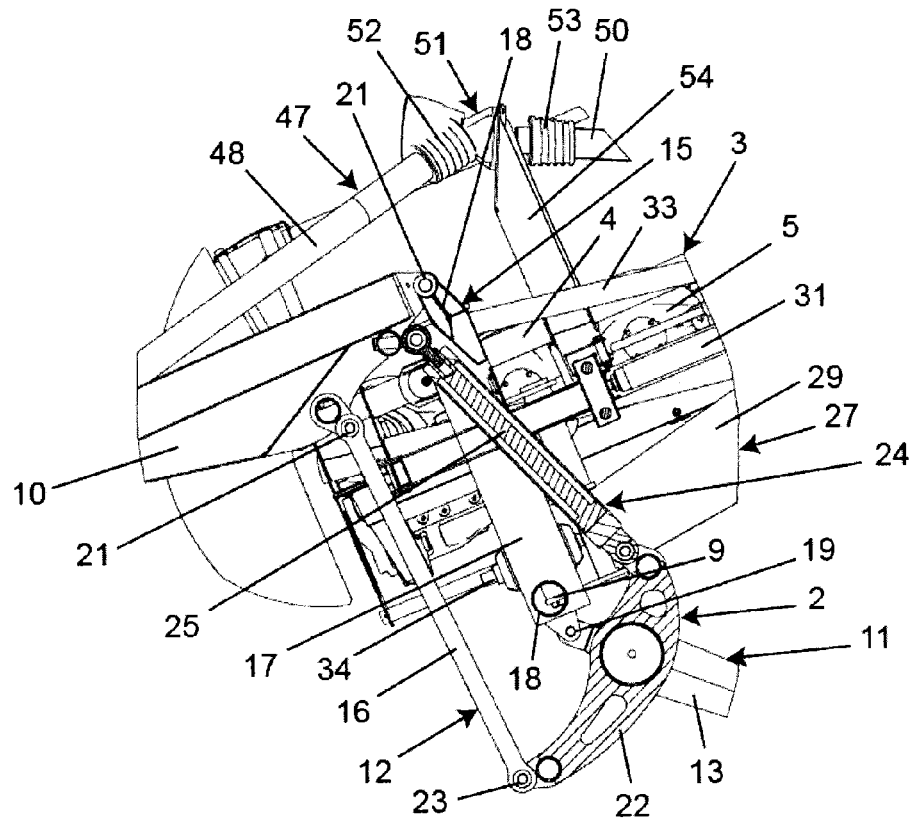
FIG. 7 represents a partial section of the first variant embodiment of the machine in transport position along the section VII-VII of FIG. 2.
Figure 8:
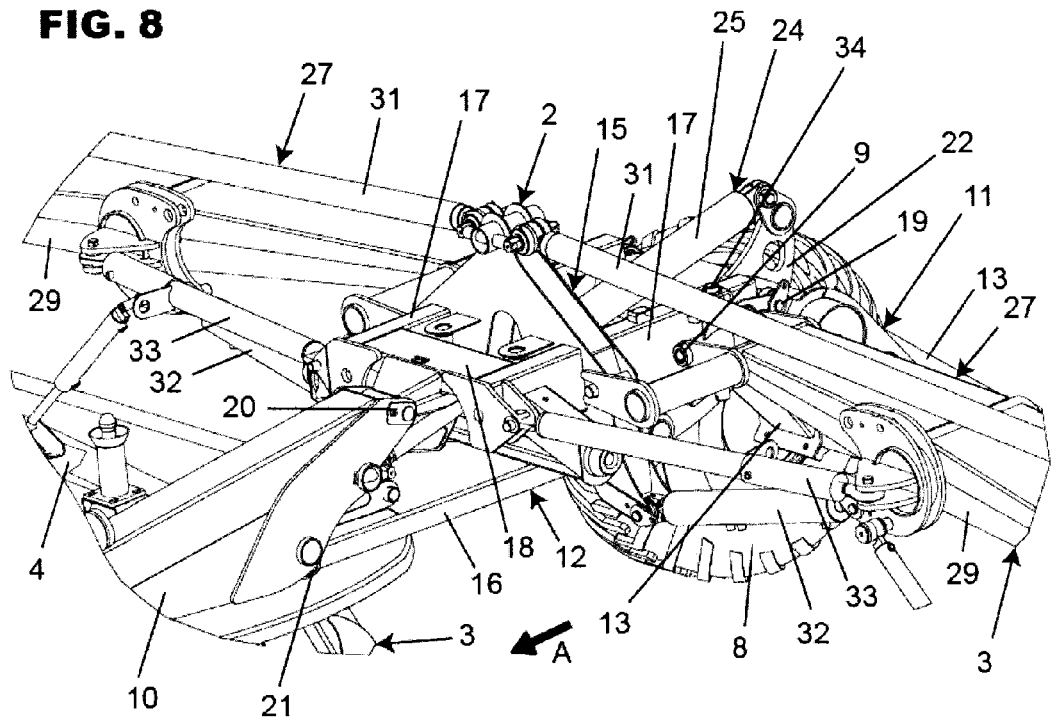
FIG. 8 represents on a larger scale a partial perspective view of the first variant embodiment of the machine in work position.

In the transport position, the device of variable length (25) has a minimum length. FIGS. 5 and 7 show that the upper connecting-rod (15) and the lower connecting-rod (16) are lowered and brought closer to the front part (10). The rear ends of the connecting-rods (15, 16) are moved in the direction of advance (A) and brought closer to the ground. As the axes of the first articulations (9) are preferably arranged towards the rear of the connecting-rods (15, 16), they are also moved in the direction of advance (A) and brought closer to the ground. The axes of the first articulations (9) therefore have an inclination towards the ground following a direction opposite to the direction of advance (A). The work devices (3) are folded back towards the rear about the first articulations (9). They can thus extend partially above the wheels (8). These features improve the stability of the machine because they allow to move the front ends of the work devices (3) closer to the front of the machine (1) and to the ground. When each of the work devices (3) is in the work position, the assembly formed by the support framework (4) and the work element (5) presents, following a lateral view of the machine (1), a greater horizontal dimension than the vertical dimension. An advantage brought about by the above-mentioned inclination of the axis of the first articulations (9), combined with the folding back of the work devices (3) towards the rear about the first articulations (9) lies in the fact that during transport, the total overall dimensions of the machine (1) in a direction perpendicular to the direction of advance (A) is at least equal to the sum of the vertical dimensions, which is less than the sum of the horizontal dimensions. This feature appears in particular in FIG. 4, and allows a particularly reduced width during transport.

The fact that during transport the upper connecting-rod (15) and the lower connecting-rod (16) are lowered and brought closer to the front part (10) gives the central frame (2), by comparison with the work position, a smaller dimension following the direction of advance (A). The displacement of the connecting-rods (15, 16) in addition allows the displacement of the centre of gravity of the central frame (2) towards the front and towards the ground, which improves the stability of the machine (1). The wheels (8) are closer to the rear wheels of the tractor (6) than during work, which improves the handling of the machine (1) when cornering, facilitates the entry onto the plot, and renders the recourse to a directional train of wheels superfluous. The displacement of the articulation device (12) combined with the folding towards the rear of the work devices (3) renders the machine (1) relatively compact in length in transport position. It is thus possible to design work devices (3) which, during work, have a large extension in a direction perpendicular to the direction of advance (A), and to keep the overall dimensions of the machine (1) during transport parallel to the direction of advance (A) at a permissible value for an easy transport on the open road.

In the work position, the axis of each of the first articulations (9) preferably extends in a substantially horizontal direction so that the work elements (5) viewed following a lateral representation of the machine (1) maintain the orientation substantially parallel to the ground which is required for following the terrain well.

In the transport position, the axis of each of the first articulations (9) can have an inclination brought closer to the vertical. The result of this is that the height of the machine (1) is considerably reduced with, as a result, a lowering of the centre of gravity of the machine (1) which is favourable to the stability during transport.

Figure 12:
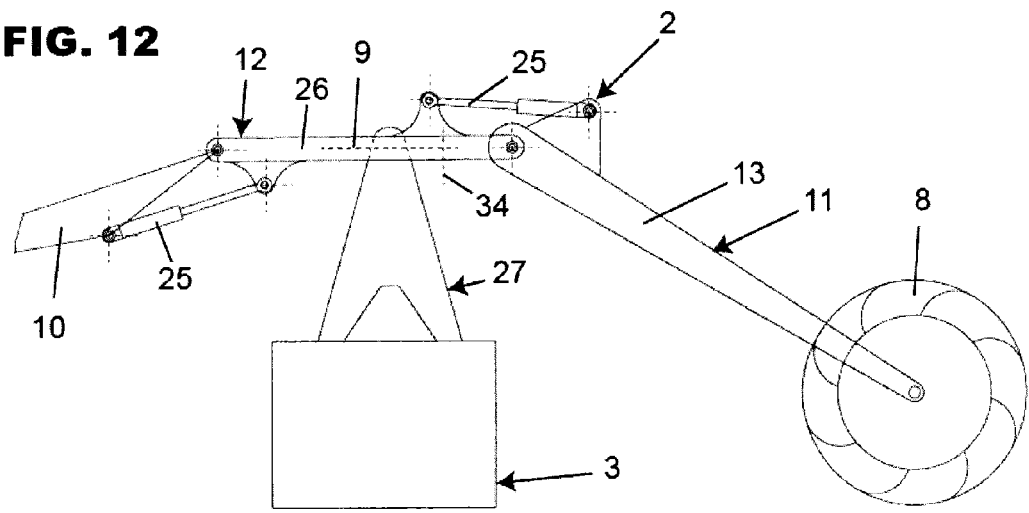
FIG. 12 represents a side view of a fourth variant embodiment of the machine according to the invention, in work position.
Figure 13:
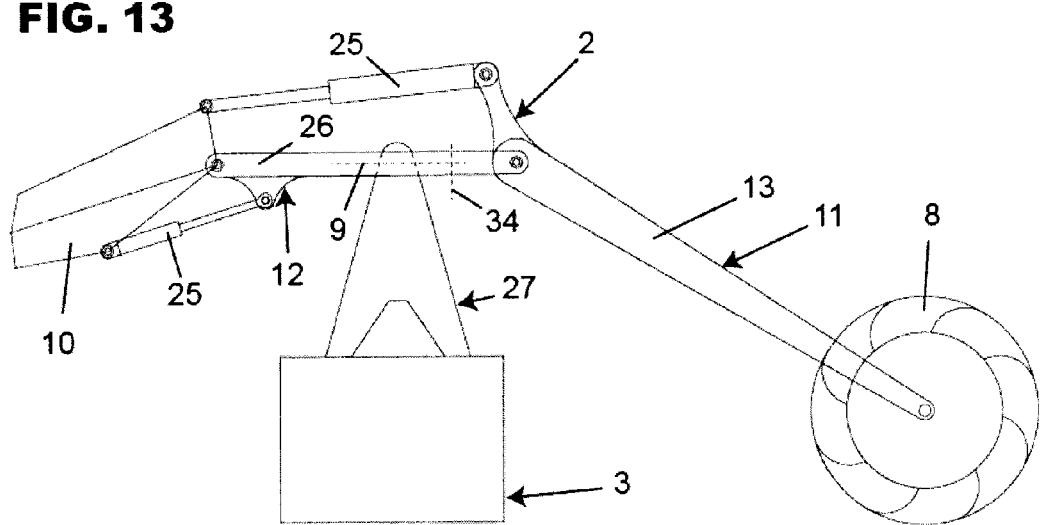
FIG. 13 represents a side view of a fifth variant embodiment of the machine according to the invention, in work position.
Figure 14:
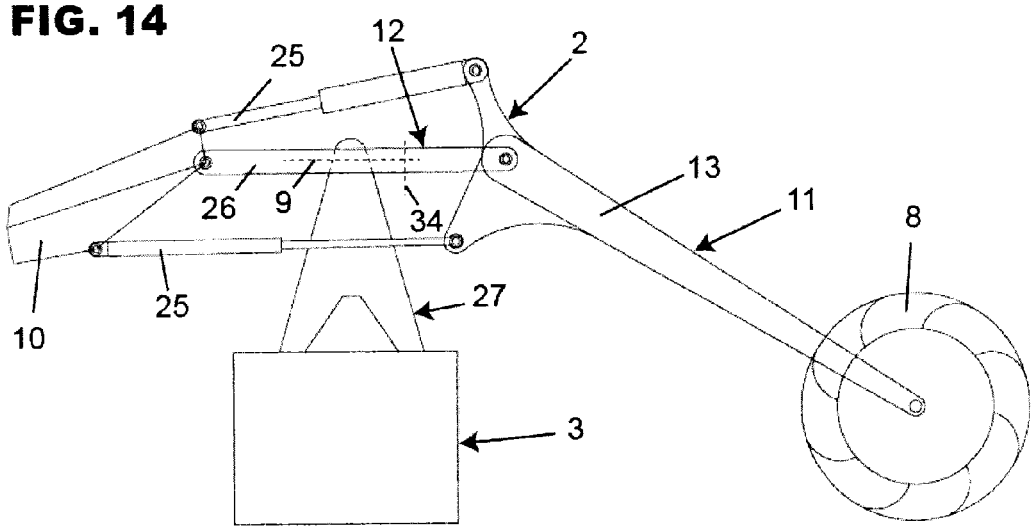
FIG. 14 represents a side view of a sixth variant embodiment of the machine according to the invention, in work position.

In a fourth variant embodiment of the machine (1) represented in FIG. 12, the articulation device (12) is constituted by a central connecting-rod (26). This central connecting-rod (26) is connected to the front part (10) and to the rear part (11) by articulations, the axes of which are substantially perpendicular to the direction of advance (A). Thus, the central frame (2) composed of the front part (10), of the rear part (11) and of the articulation device (12) deforms in a plane which is substantially vertical and substantially parallel to the direction of advance (A).

In this fourth variant embodiment, the displacement device (24) is composed of a first device of variable length (25) articulated between the central connecting-rod (26) and the front part (10), and of a second device of variable length (25) articulated between the central connecting-rod (26) and the rear part (11).

A fifth variant embodiment as well as a sixth are distinguished from the fourth by the fact that the displacement device (24) is carried out differently. In fact, the fifth variant embodiment makes provision that the displacement device (24) is composed of a first device of variable length (25) articulated between the central connecting-rod (26) and the central frame (2), otherwise between the central connecting-rod (26) and the front part (10) or else between the central connecting-rod (26) and the rear part (11), and of a second device of variable length (25) articulated between the front part (10) and the rear part (11). The sixth variant embodiment makes provision that the displacement device (24) is composed of a first device of variable length (25) and also of a second, which are both articulated between the front part (10) and the rear part (11), and which are preferably not parallel with respect to one another.

In the above-mentioned fourth, fifth and sixth variant embodiments, at least one of the devices of variable length (25) can be a hydraulic jack.

In the transport position, the central connecting-rod (26) is lowered and brought closer to the front part (10). The rear end of the central connecting-rod (26) is moved in the direction of advance (A) and brought closer to the ground. The result of this is that the axes of the first articulations (9) are also moved in the direction of advance (A) and brought closer to the ground. They therefore have an inclination towards the ground following a direction opposite to the direction of advance (A). Preferably, the axes are themselves also moved in the direction of advance (A) and brought closer to the ground. The work devices (3) are folded back towards the rear about the first articulations (9). The central frame (2) has a dimension following the direction of advance (A) which is smaller than during work, and its centre of gravity is moved towards the front and towards the ground. The wheels (8) are brought closer to the rear wheels of the tractor (6). In the work position, the axis of each of the first articulations (9) preferably extends in a substantially horizontal direction, whilst in the transport position it can have an inclination brought closer to the vertical.

The embodiment of the machine (1) according to the invention previously described makes provision that each of the work devices (3) is connected by the corresponding first articulation (9) to the articulation device (12).

Thus, in the first, second and third variant embodiments, each of the work devices (3) is connected by the corresponding first articulation (9) to the upper connecting-rod (15) or else to the lower connecting-rod (16). The fact of connecting each of the work devices (3) to the upper connecting-rod (15), as represented in FIGS. 1 to 9, presents the advantage that the upper connecting-rod (15) can be formed by a complex structure presenting a certain vertical extension, without this vertical extension coming to reduce the ground clearance of the machine (1). The design of a complex structure for the connecting-rod connected to the work devices (3) can be required in particular by rigidity requirements. Alternatively, each of the work devices (3) can be connected by the corresponding first articulation (9) to the lower connecting-rod (16). This arrangement can be preferred so as to lower the centre of gravity of the machine (1) during work and during transport.

In the fourth, fifth and sixth variant embodiments, each of the work devices (3) is connected by the corresponding first articulation (9) to the central connecting-rod (26).

Given that the machine (1) is substantially symmetrical with respect to the plane (55), the centre of gravity of the machine (1) is located in or at a slight distance from the plane (55). Preferably, the centre of gravity of the machine (1) in the transport position is situated at the front and close to the axis of the wheels (8). The fact that the centre of gravity is situated at the front of the wheels (8) prevents any risk of tipping at the rear of the machine (1), and the fact that it is, in addition, located close to the axis of the wheels (8) limits the risk of a tipping about an axis parallel to the direction of advance (A).

Each of the work devices (3) includes a connecting device (27) and a support framework (4) which supports at least one work element (5). In the variant embodiments represented in the attached figures, each of the work elements (5) is formed by a cutter bar including a plurality of rotors constituted by discs or drums provided with blades which extend beyond their periphery. The rotors are mounted on bearings arranged at more or less regular intervals on the cutter bar and are, in operation, carried in rapid rotation by means of a train of gears incorporated in a sealed casing containing a lubricant such as oil. By being set in rotation, the blades then come to cut the plants. The casing of the cutter bar is in the form of an elongated parallelepiped. The train of gears is actuated by transmission means able to transmit the necessary energy from the tractor, these transmission means including in particular a gear casing (46) and an articulated transmission element (47). The cutter bars can be associated with conditioning rotors or rollers for the mown products.

However, it can be envisaged to form the work element (5) by a windrowing device, a grinder or a rotary harrow, this list not being exhaustive. As can be seen in particular from FIG. 3, the connecting device (27) is connected on one hand to the articulation device (12) by the first articulation (9), on another hand to the support framework (4) by a second articulation (28). Thus, it must be understood that in the first, second and third variant embodiments of the machine (1), the connecting device (27) is connected by the first articulation (9) either to the upper connecting-rod (15), or to the lower connecting-rod (16). It is understood that in the fourth, fifth and sixth variant embodiments of the machine, the connecting device (27) is connected by the first articulation (9) to the central connecting-rod (26).

An important feature of the connecting device (27) is that it is carried out such that the distance separating the axis of the first articulation (9) from the axis of the second articulation (28) is greater in the work position than in the transport position. To this end, the connecting device (27) can be carried out in different ways which are clarified below with reference to the figures.

Figure 3:
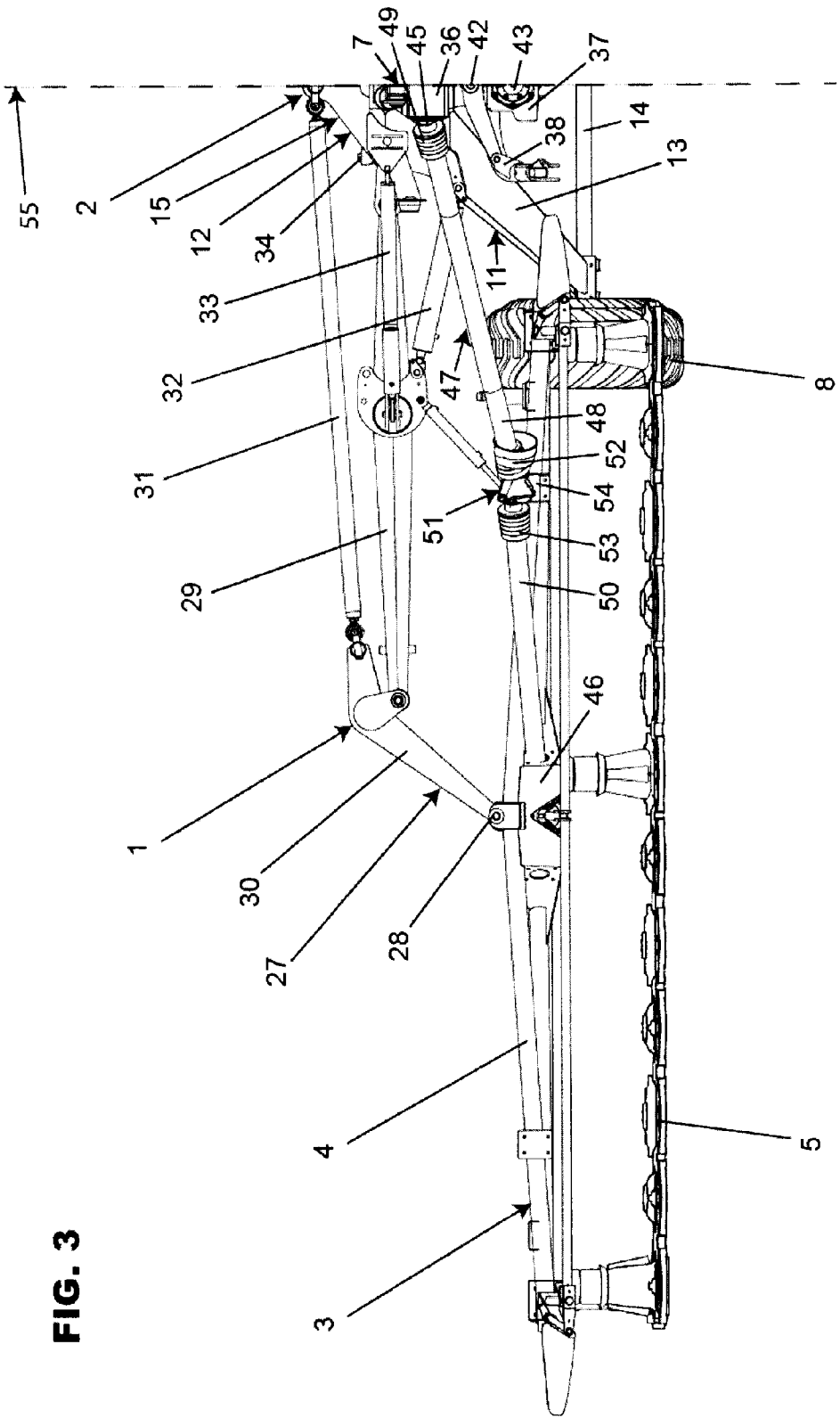
FIG. 3 represents a partial front view of the first variant embodiment of the machine in work position.

In a preferred embodiment, illustrated in particular by FIG. 3, the connecting device (27) includes a support arm (29), an arm (30) and a connecting element (31). The support arm (29) is connected to the articulation device (12) by the first articulation (9) and is articulated to the arm (30). The arm (30) is connected to the support framework (4) by the second articulation (28). It is understood that in the first, second and third variant embodiments of the machine (1), the first articulation (9) connects the support arm (29) either to the upper connecting-rod (15) or to the lower connecting-rod (16), and that in the fourth, fifth and sixth variant embodiments, the first articulation (9) connects the support arm (29) to the central connecting-rod (26).

The connecting element (31) can be a bar articulated on one hand to the arm (30), on another hand to the articulation device (12), therefore either to the upper connecting-rod (15) or to the lower connecting-rod (16) or to the central connecting-rod (26), as a function of the variant embodiments taken in account.

Figure 15:
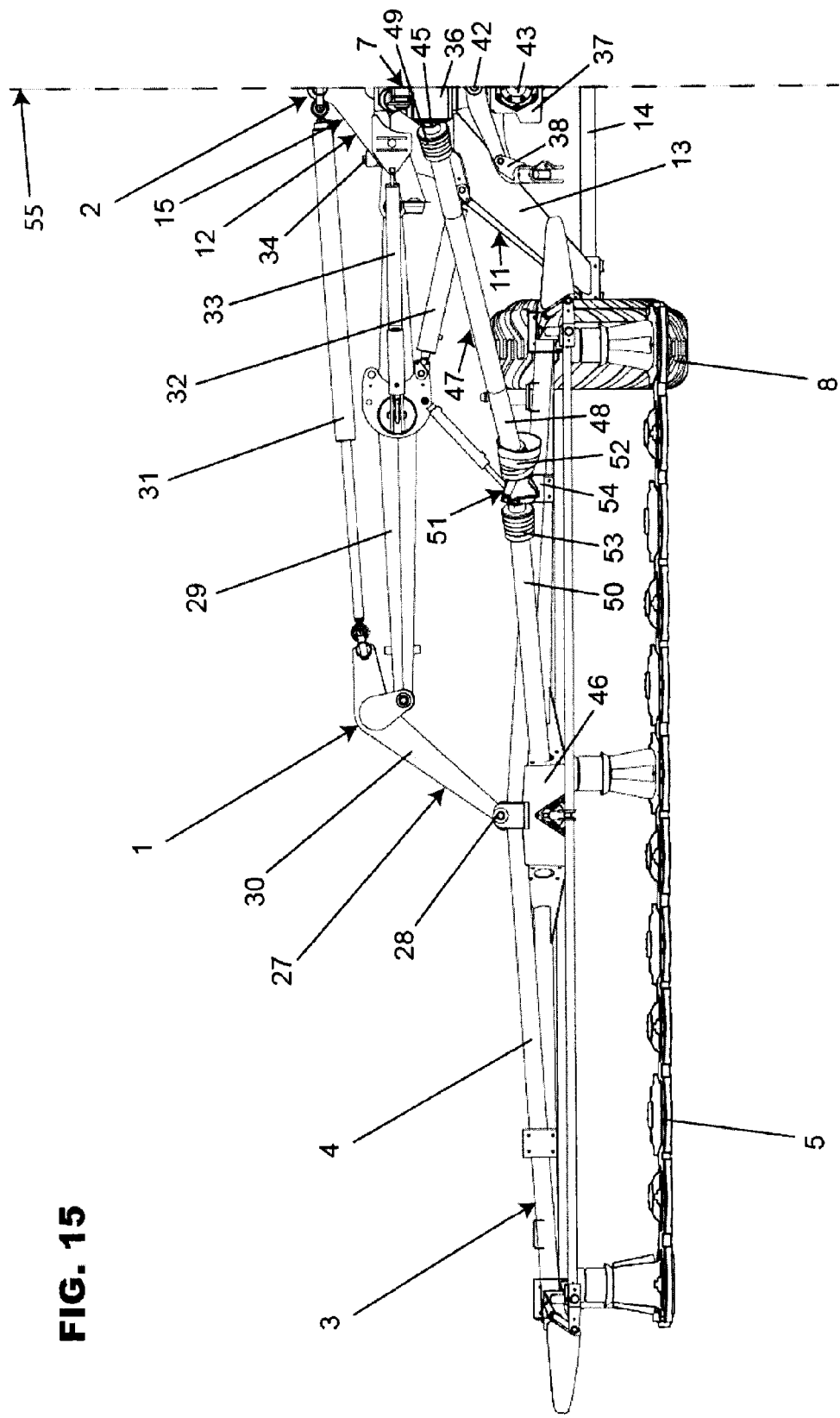
FIG. 15 represents a front view of an embodiment of the connecting device, in work position.
Figure 16:
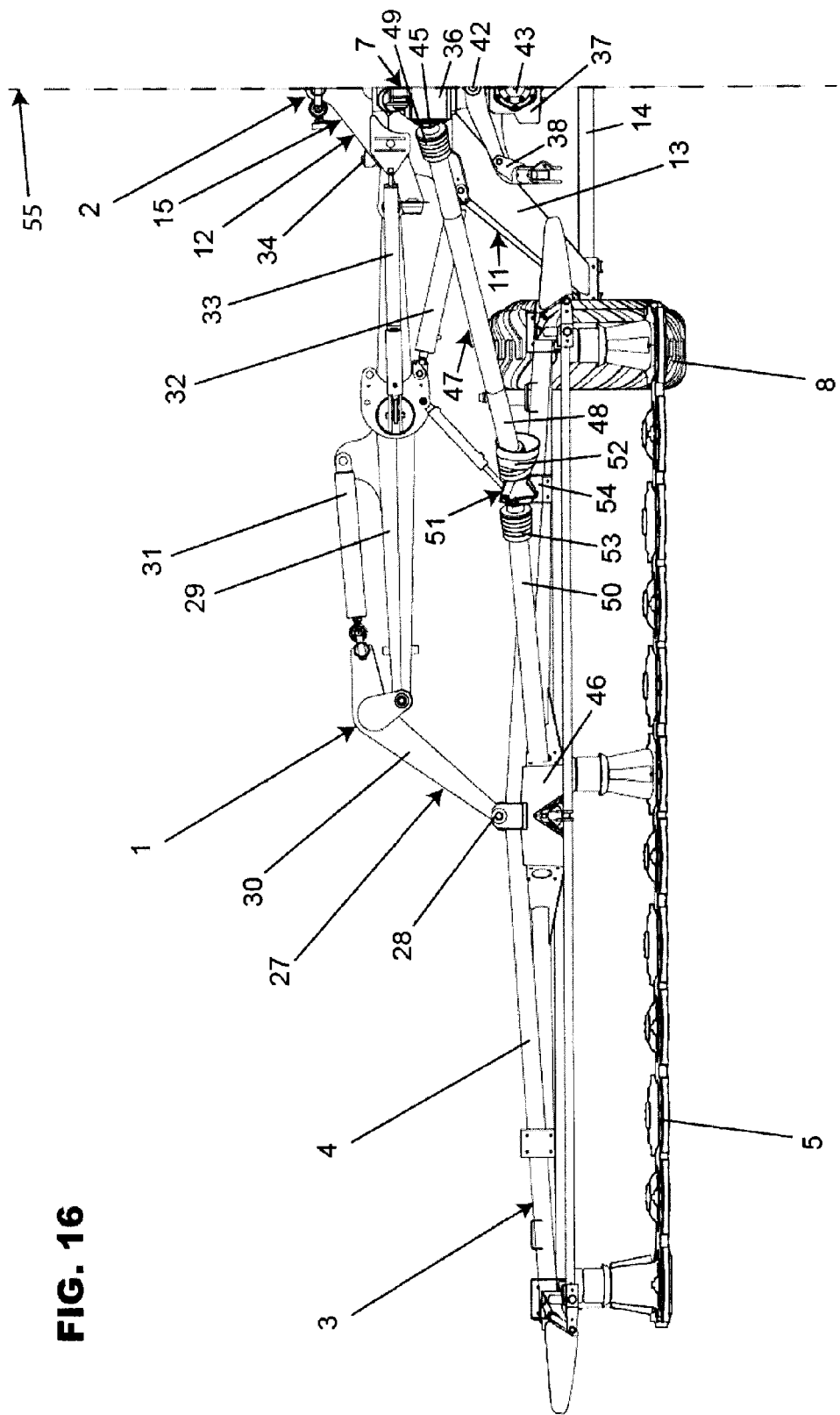
FIG. 16 represents a front view of an embodiment of the connecting device, in work position.

Alternatively, the connecting element (31) can be a jack articulated to the arm (30) and to the articulation device (12), as shown in FIG. 15, or else a jack articulated to the arm (30) and to the support arm (29), as shown in FIG. 16. The fact that the connecting element (31) is a jack rather than a bar brings the advantage that, in the work position, a variation in length of the jack brings about a translation of the work element (5) following a direction substantially perpendicular to the direction of advance (A). Now, the machine (1) according to the invention is preferably used in combination with a frontal agricultural machine of the same type. Such a combination must ensure an overlap between the working width of the frontal machine and the respective working widths of the work devices (3). So as to ensure that this operating condition is respected, in particular when the assembly formed by the tractor, the frontal machine and the machine (1) according to the invention follows a curved trajectory on the ground or else rolls over a sloping ground, it is necessary to provide a device making it possible to offset at least one of the work elements (5) following a direction perpendicular to the direction of advance (A). This effect is obtained by a variation in length of the jack, which brings about a pivoting of the arm (30) about the second articulation (28). The articulation between the arm (30) and the support framework (4) is then moved in a direction perpendicular to the direction of advance (A) and this results in the sought translation of at least one of the work elements (5).

Figure 17:
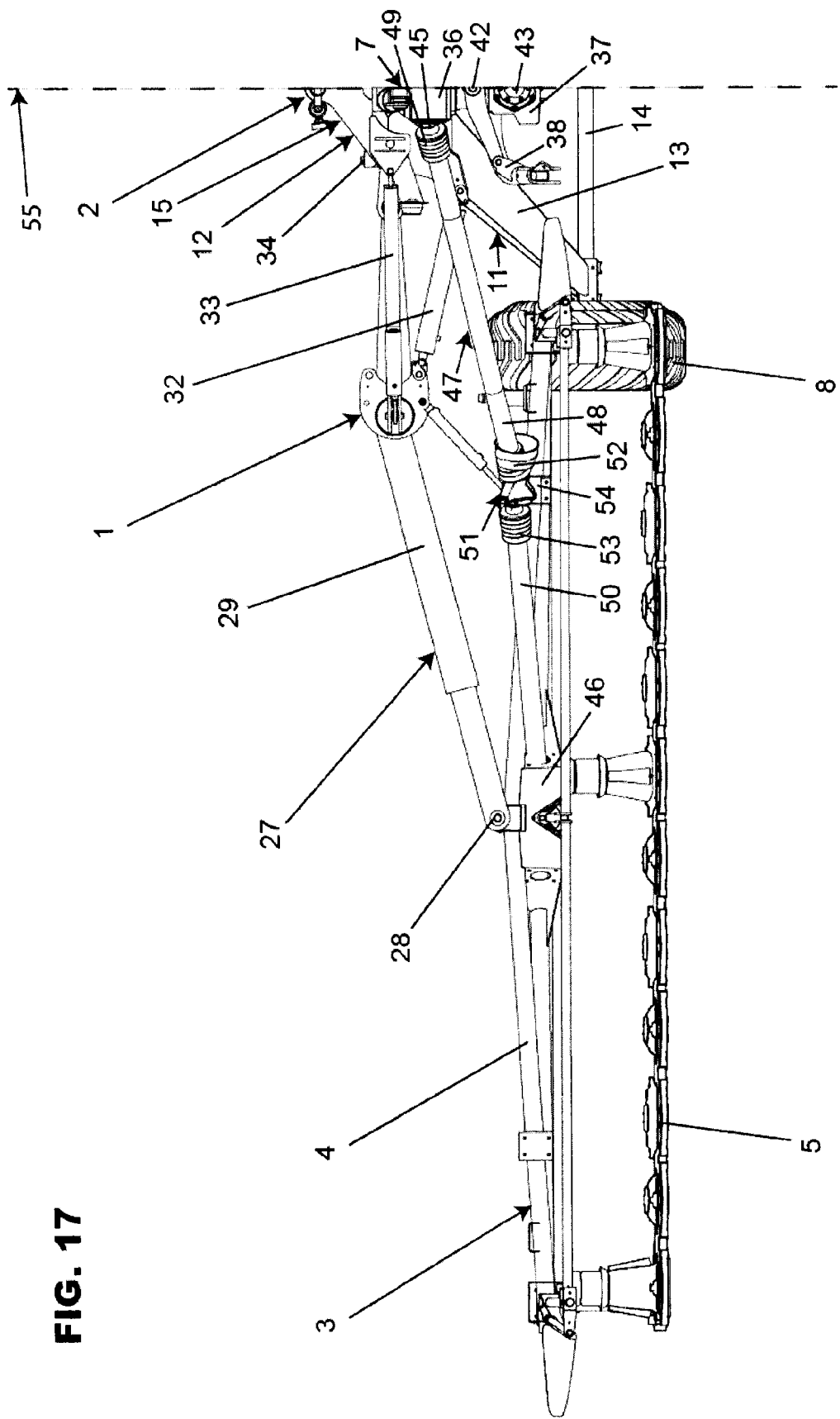
FIG. 17 represents a front view of an embodiment of the connecting device, in work position.

Alternatively, the same effect can be achieved by the fact that the connecting device (27) is a support arm formed by two bars which are able to slide one with respect to the other, as shown in FIG. 17. The sliding of the two bars can be operated by a hydraulic jack articulated to the two bars, with a lengthening of the jack having the effect of a distancing of the two bars and therefore a lengthening of the support arm, whereas a contraction of the jack has the effect of a moving closer of the two bars and therefore a shortening of the support arm.

In the work position shown in FIGS. 2 and 3, the distance separating the axis of the first articulation (9) from the axis of the second articulation (28) is substantially maximum, the consequence being that the work elements (5) have a substantially maximum distancing one with respect to the other following a direction perpendicular to the direction of advance (A). Now, the machine (1) according to the invention is preferably used in combination with a frontal agricultural machine of the same type, designed and mounted such that there is an overlap between the working width of the frontal machine and the respective working widths of the work devices (3). Consequently, the above-mentioned maximum distancing allows the combination of the frontal machine and of the machine (1) according to the invention to work over a large width. The fact that the distance separating the axis of the first articulation (9) from the axis of the second articulation (28) is greater in the work position than in the transport position has as a second advantageous consequence the reducing of the length of the machine (1) in the transport position.

Furthermore, a lifting jack (32) is provided, articulated between the articulation device (12) and each of the work devices (3), preferably between the articulation device (12) and each of the support arms (29). In the work position, the lifting jack (32) allows on one hand the lifting at a certain distance above the ground of the work elements (5) during passage over a windrow, on another hand the adjusting of the pressure exerted on the ground by the work elements (5).

A release jack (33), articulated between the articulation device (12) and each of the work devices (3), preferably between the articulation device (12) and each of the support arms (29) is also provided. In addition, each of the work devices (3) in the work position can pivot about a third articulation (34) having a substantially vertical axis. In the variant embodiment illustrated by FIGS. 1 to 9, the release jack (33) is articulated at the front of the upper connecting-rod (15) and at the front of the support arm (29), furthermore the third articulation (34) connects the upper connecting-rod (15) to the first articulation (9), such that in the work position the work device (3) can pivot in a substantially horizontal plane. When the work element (5) meets an obstacle such as a stone, the third articulation (34) allows the work device (3) to pivot about it in a direction opposite to the direction of advance (A), with the aim of damping the impact against this obstacle. Once the obstacle has been passed, the release jack (33) returns the work device (3) into its initial position substantially perpendicular to the direction of advance (A).

The front part (10) is attached to the hitching device (7) by means of a connection (35). The hitching device (7) includes an upper casing (36), a lower casing (37) and a hitching arch (38) connectable to the two bottom anchoring points (39) of the three-point hitching device (40) of the tractor (6). The upper casing (36) and the lower casing (37) are connected by a fourth articulation (41), the axis of which is substantially vertical. Thus, the fourth articulation (41) enables the central frame (2) to pivot freely with respect to the tractor (6) in a substantially horizontal plane, and hence makes it possible to improve the handling of the tractor (6)—machine (1) assembly both in transport position and in work position, without it being necessary to provide the machine (1) with a directional train of wheels. The lower casing (37) is connected to the hitching arch (38) by a fifth articulation (42), the axis of which is substantially horizontal and perpendicular to the straight line connecting the two bottom anchoring points (39). Thus, the fifth articulation (42) enables the central frame (2) to pivot freely with respect to the tractor (6) following an axis parallel to the direction of advance (A), the pivoting enabling the work devices (3), in particular in work position, to follow the terrain over the whole of their width when the tractor (6)—machine (1) assembly passes from a horizontal ground to a sloping ground or vice versa.

The lower casing (37) includes an input hitching element (43) designed to be hitched to the power take-off (44) of the tractor (6) with a view to the driving of the work elements (5). The upper casing (36) includes two output hitching elements (45) which are each directed towards one, respectively the other, of the work devices (3). The lower casing (37) and the upper casing (36) contain meshing elements connecting mechanically the input hitching element (43) to the output hitching elements (45) such that the mechanical energy provided to the input hitching element (43) is evenly distributed towards the output hitching elements (45). An example embodiment of the meshing elements comprises a first toothed wheel which is rigidly fastened to the input hitching element (43) and turning about the same axis as the input hitching element (43). This first toothed wheel meshes with a second toothed wheel oriented perpendicularly to the first toothed wheel, the second toothed wheel turning about an axis coincident with the axis of the fourth articulation (41). The first and second toothed wheels are housed inside of the lower casing (37). The second toothed wheel is rigidly fastened to a third toothed wheel turning about the same axis as the second toothed wheel. The third toothed wheel is housed in the upper casing (36) and meshes directly with two output toothed wheels which drive in rotation the output hitching elements (45).

The hitching device (7) which is thus constituted enables the central frame (2) to pivot in all the planes with a great amplitude, whilst ensuring a homokinetic driving of the work elements (5).

Each work device (3) includes a gear casing (46) for the putting into motion of at least one of the work elements (5). The gear casing (46) is preferably formed by a gear transmission casing including one or more reduction steps. The gear casing (46) is connected to the output hitching element (45) directed towards the corresponding work device (3) via an articulated transmission element (47). The articulated transmission element (47) includes a first telescopic shaft (48) connected by a universal joint (49) of the cardan type to the output hitching element (45) and also a second shaft (50) connected by a universal joint, which is not shown, of the cardan type to the gear casing (46). The first and second shafts (48, 50) are connected by a coupling (51) formed by a rigid shaft carrying at each of its ends a universal joint (52, 53) of the cardan type connected to the first, respectively to the second shaft. The rigid shaft is in pivot connection with respect to a support (54) which is rigidly fastened to the support framework (4) of the work device (3). The pivot connection is positioned with respect to the work device (3) such that the length of the first telescopic shaft (48) is substantially constant between the work position and the transport position.

It is readily evident that the invention is not limited to the embodiment described above and represented in the attached figures. Modifications remain possible, in particular with regard to the constitution or the number of the various elements or by substitution of technical equivalents without, however, departing from the scope of protection.

The invention claimed is:

1. An agricultural machine comprising:
a central frame and two work devices, the central frame being designed to be connected to a tractor so as to be towed by the tractor, and being provided with wheels in contact with the ground, each work device being connected to the central frame by a first articulation and being able to be moved between a transport position in which each work device extends in a plane substantially parallel to a direction of advance, and a work position in which each work device extends in a plane substantially perpendicular to the direction of advance,
wherein the central frame includes a front part, a rear part which carries the wheels, and an articulation device,
wherein the articulation device comprises at least one connecting-rod articulated to the front part and to the rear part, the articulation device can pivot by means of a displacement device, in a plane which is substantially vertical and substantially parallel to the direction of advance with respect to the front part and with respect to the rear part,
wherein each work device is connected directly to the articulation device by the first articulation, an axis of the first articulation extends in a plane which is substantially vertical and substantially parallel to the direction of advance,
wherein, in the transport position, the axis of the first articulation presents an inclination towards the ground following a direction opposite to the direction of advance in the plane, and
wherein, in the transport position, each work device is folded towards the rear about the first articulation.

2. The agricultural machine according to claim 1, wherein, in the work position, the axis of the first articulation extends in a substantially horizontal direction.

3. The agricultural machine according to claim 1, wherein, in the transport position, the axis of the first articulation has a position close to the vertical.

4. The agricultural machine according to claim 1, wherein the at least one connecting-rod of the articulation device comprises a rear end articulated to the rear part, and
wherein the rear end is moved in the direction of advance and towards the ground when the agricultural machine is moved from the work position to the transport position.

5. The agricultural machine according to claim 4, wherein the axes of the first articulations are moved in the direction of advance and towards the ground when the agricultural machine is moved from the work position to the transport position.

6. The agricultural machine according to Claim 1, wherein the articulation device is composed of an upper connecting-rod and a lower connecting-rod forming a deformable quadrilateral, the upper connecting-rod is articulated to the front part by means of an articulation and the rear part by means of an articulation, and the lower connecting-rod is articulated to the front part by means of an articulation and to the rear part by means of an articulation.

7. The agricultural machine according to claim 6, wherein the displacement device is a device of variable length articulated between the front part and the rear part.

8. The agricultural machine according to claim 6, wherein the displacement device is a device of variable length articulated between the upper connecting rod and the lower connecting-rod.

9. The agricultural machine according to claim 6, wherein the displacement device is a device of variable length articulated between one of the connecting-rods and the central frame.

10. The agricultural machine according to claim 7, wherein the device of variable length is a hydraulic jack.

11. The agricultural machine according to claim 1, wherein the articulation device is constituted by a central connecting-rod.

12. The agricultural machine according to claim 11, wherein the displacement device is composed of a first device of variable length articulated between the central connecting-rod and the front part, and of a second device of variable length articulated between the central connecting-rod and the rear part.

13. The agricultural machine according to claim 11, wherein the displacement device is composed of a first device of variable length articulated between the central connecting-rod and the central frame, and of a second device of variable length articulated between the front part and the rear part.

14. The agricultural machine according to claim 11, wherein the displacement device is composed of a first device of variable length articulated between the front part and the rear part, and of a second device of variable length articulated between the front part and the rear part.

15. The agricultural machine according claim 12, wherein at least one of the devices of variable length is a hydraulic jack.

16. The agricultural machine according to claim 1, wherein in the transport position, a center of gravity of the machine is located at a front thereof and close to an axis of the wheels.

17. The agricultural machine according to Claim 1, wherein each work device includes a connecting device and a support framework which supports at least one work element, the connecting device is connected to the articulation device by the first articulation, the connecting device is connected to the support framework by a second articulation, and the connecting device is carried out such that a distance separating the axis of the first articulation from an axis of the second articulation is greater in the work position than in the transport position.

18. The agricultural machine according to claim 17, wherein the connecting device includes a support arm, an arm and a connecting element, the support arm is connected to the articulation device by the first articulation and is articulated to the arm, the arm is connected to the support framework by the second articulation, and the connecting element is articulated to the arm.

19. The agricultural machine according to claim 18, wherein the connecting element is a bar articulated to the articulation device.

20. The agricultural machine according to claim 18, wherein the connecting element is a jack articulated to the articulation device and the jack is articulated to the arm such that, in the work position, a variation in length of the jack brings about a translation of the work element following a direction substantially perpendicular to the direction of advance.

21. The agricultural machine according to claim 18, wherein the connecting element is a jack articulated to the support arm and the jack is articulated to the arm such that, in the work position, a variation in length of the jack brings about a translation of the work element following a direction substantially perpendicular to the direction of advance.

22. The agricultural machine according to claim 17, wherein the connecting device is a support arm formed by two bars able to slide one with respect to the other.

23. The agricultural machine according to claim 1, wherein a lifting jack is articulated between the articulation device and each of the work devices.

24. The agricultural machine according to claim 1, wherein a release jack is articulated between the articulation device and each of the work devices, and each of the work devices in the work position can pivot about a third articulation having a substantially vertical axis.

25. The agricultural machine according to claim 1, wherein the front part is attached by means of a connection to a hitching device including an upper casing, a lower casing and a hitching arch connectable to two bottom anchoring points of a three-point hitching device of the tractor, the connection connects the front part to the upper casing, the upper casing and the lower casing are connected by a fourth articulation, the axis of which is substantially vertical, the lower casing is connected to the hitching arch by a fifth articulation, the axis of which is substantially horizontal and perpendicular to a straight line connecting the two bottom anchoring points.

26. The agricultural machine according to claim 24, wherein a lower casing includes an input hitching element designed to be hitched to a power take-off of the tractor, the upper casing includes two output hitching elements, each of the output hitching elements is directed towards the respective work devices, the lower casing and the upper casing contain meshing elements connecting mechanically the input hitching element to the output hitching elements such that the mechanical energy provided to the input hitching element is evenly distributed towards the output hitching elements.

27. The agricultural machine according to claim 25, wherein each work device includes a gear casing for the putting into motion of at least one of a work elements, the gear casing is connected to an output hitching element directed towards the work device via an articulated transmission element which includes a telescopic shaft, the articulated transmission element being articulated to the work device such that a length of the telescopic shaft is substantially constant between the work position and the transport position.

28. The agricultural machine according to claim 1, wherein the machine is a mower.

* * * * *